(12) United States Patent
LaSalle et al.

(10) Patent No.: US 12,110,456 B2
(45) Date of Patent: Oct. 8, 2024

(54) BIOMASS-BASED METHOD AND COMPOSITION

(71) Applicant: florrent, Inc., Amherst, MA (US)

(72) Inventors: Jose LaSalle, Corvallis, OR (US); Alexander Stuart Nichols, Somerville, MA (US)

(73) Assignee: florrent, Inc., Amherst, MA (US)

( * ) Notice: Subject to any disclaimer, the term of this patent is extended or adjusted under 35 U.S.C. 154(b) by 332 days.

(21) Appl. No.: 17/410,989

(22) Filed: Aug. 24, 2021

(65) Prior Publication Data

US 2022/0064536 A1    Mar. 3, 2022

Related U.S. Application Data (60) Provisional application No. 63/071,660, filed on Aug. 28, 2020.

(51) Int. Cl.
| | |
|---|---|
| *C10B 53/02* | (2006.01) |
| *H01G 11/34* | (2013.01) |
| *H01M 4/04* | (2006.01) |
| *H01M 4/1393* | (2010.01) |
| *H01M 4/36* | (2006.01) |
| *H01M 4/58* | (2010.01) |

(52) U.S. Cl.
CPC ............ *C10B 53/02* (2013.01); *H01G 11/34* (2013.01); *H01M 4/0471* (2013.01); *H01M 4/1393* (2013.01); *H01M 4/364* (2013.01); *H01M 4/5825* (2013.01)

(58) Field of Classification Search
CPC ........ C10B 53/02; H01G 11/34; H01G 11/44; H01G 11/38; H01M 4/0471; H01M 4/1393; H01M 4/364; H01M 4/5825; H01M 10/0525; Y02E 50/10; Y02E 60/10
See application file for complete search history.

(56) References Cited

U.S. PATENT DOCUMENTS

| | | |
|---|---|---|
| 4,082,694 A | 4/1978 | Wennerberg et al. |
| 5,064,805 A | 11/1991 | Otowa |
| 5,416,056 A | 5/1995 | Baker |
| 5,877,935 A | 3/1999 | Sato et al. |
| 5,891,822 A | 4/1999 | Oyama et al. |
| 5,972,536 A | 10/1999 | Yamada et al. |
| 6,038,123 A | 3/2000 | Shimodaira et al. |
| 6,043,183 A | 3/2000 | Alford |
| 6,291,069 B1 | 9/2001 | Noguchi et al. |

(Continued)

FOREIGN PATENT DOCUMENTS

| | | |
|---|---|---|
| CN | 106229162 B | 7/2018 |
| CN | 105948041 B | 3/2019 |

(Continued)

OTHER PUBLICATIONS

Chacon et al., "Understanding, measuring and tuning the electrochemical properties of biochar for environmental applications", Rev Environ Sci Biotechnol, pp. 1-21 (2017).

(Continued)

*Primary Examiner* — Andrew J. Oyer
(74) *Attorney, Agent, or Firm* — Wolf, Greenfield & Sacks, P.C.

(57) ABSTRACT

Methods and compositions suitable for forming electrodes and other components of energy storage devices are disclosed.

22 Claims, 6 Drawing Sheets

(56) References Cited

U.S. PATENT DOCUMENTS

| | | |
|---|---|---|
| 6,310,762 B1 | 10/2001 | Okamura et al. |
| 6,547,990 B2 | 4/2003 | Shinozaki et al. |
| 6,585,915 B2 | 7/2003 | Shinozaki et al. |
| 6,660,583 B2 | 12/2003 | Fujino et al. |
| 6,721,168 B2 | 4/2004 | Takeuchi et al. |
| 6,738,252 B2 | 5/2004 | Okamura et al. |
| 6,768,631 B2 | 7/2004 | Uehara et al. |
| 6,827,879 B2 | 12/2004 | Shinozaki et al. |
| 6,882,517 B2 | 4/2005 | Tano et al. |
| 7,067,051 B2 | 6/2006 | Fujino |
| 7,088,570 B2 | 8/2006 | Fujino et al. |
| 7,214,646 B1 | 5/2007 | Fujino et al. |
| 7,256,157 B2 | 8/2007 | Tsuruya et al. |
| 7,410,510 B2 | 8/2008 | Fujino et al. |
| 7,564,676 B2 | 7/2009 | Kitajima et al. |
| 7,582,902 B2 | 9/2009 | Tano et al. |
| 7,625,543 B2 | 12/2009 | Shigematsu et al. |
| 7,709,415 B2 | 5/2010 | Sugo et al. |
| 7,754,178 B2 | 7/2010 | Tano et al. |
| 7,759,289 B2 | 7/2010 | Iwasaki et al. |
| 7,799,733 B2 | 9/2010 | Wagh et al. |
| 8,198,210 B2 * | 6/2012 | Gadkaree .............. C01B 32/378 502/417 |
| 8,252,716 B2 | 8/2012 | Gadkaree et al. |
| 8,273,683 B2 | 9/2012 | Tanaka |
| 8,284,540 B2 | 10/2012 | Fujii et al. |
| 8,318,356 B2 | 11/2012 | Gadkaree et al. |
| 8,329,341 B2 | 12/2012 | Gadkaree et al. |
| 8,437,116 B2 | 5/2013 | Gadkaree et al. |
| 8,524,632 B2 | 9/2013 | Gadkaree et al. |
| 8,541,338 B2 | 9/2013 | Gadkaree et al. |
| 8,664,155 B2 | 3/2014 | Fujii et al. |
| 8,691,177 B2 | 4/2014 | Pfeifer et al. |
| 8,709,122 B2 | 4/2014 | Lee et al. |
| 8,784,764 B2 | 7/2014 | Gadkaree et al. |
| 8,785,048 B2 | 7/2014 | Higaonna et al. |
| 8,809,231 B2 | 8/2014 | Liu et al. |
| 8,858,654 B2 | 10/2014 | Fujii et al. |
| 8,921,263 B2 | 12/2014 | Fletcher et al. |
| 9,006,136 B2 | 4/2015 | Gadkaree et al. |
| 9,018,131 B2 * | 4/2015 | Fagan .................. C01B 32/342 502/418 |
| 9,108,852 B1 | 8/2015 | Gadkaree et al. |
| 9,478,365 B2 * | 10/2016 | Mitlin .................. C01B 32/342 |
| 9,941,059 B2 | 4/2018 | Gadkaree et al. |
| 10,170,251 B2 | 1/2019 | Mitlin et al. |
| 10,246,336 B2 | 4/2019 | Liu et al. |
| 10,680,300 B2 | 6/2020 | Mitlin et al. |
| 2019/0330443 A1 * | 10/2019 | Kander .................. C08J 3/203 |
| 2019/0344234 A1 | 11/2019 | Malyala et al. |
| 2019/0344235 A1 * | 11/2019 | Malyala .................. C05G 3/80 |
| 2020/0098520 A1 * | 3/2020 | Kleidon .................. H01G 11/40 |

FOREIGN PATENT DOCUMENTS

| | | |
|---|---|---|
| CN | 109516458 A | 3/2019 |
| CN | 111547723 A | 8/2020 |
| KR | 101933146 | 12/2018 |
| WO | WO 2018/183564 A1 | 10/2018 |

OTHER PUBLICATIONS

Liu et al., "Design and Preparation of Biomass-Derived Carbon Materials for Supercapacitors: A Review", Journal of Carbon Research, 4, 53, pp. 1-32 (2018).

International Search Report and Written Opinion dated Dec. 9, 2021 in Application No. PCT/US2021/47402.

Extended European Search Report, mailed Apr. 18, 2024 for European Application No. 21862599.4.

Long et al., Porous layer-stacking carbon derived from in-built template in biomass for high volumetric performance supercapacitors. Nano Energy. Mar. 2015;12:141-151. doi: 10.1016/j.nanoen. 2014.12.014.

EP 21862599.4, Apr. 18, 2024, Extended European Search Report.

* cited by examiner

BIOMASS-BASED METHOD AND COMPOSITION

CROSS REFERENCE TO RELATED APPLICATIONS

This application claims priority to, and the benefit of, U.S. Provisional Patent Application Ser. No. 63/071,660 filed Aug. 28, 2020 entitled "BIOMASS-BASED METHOD AND COMPOSITION," the disclosure of which is hereby incorporated by reference in their entirety.

FIELD OF INVENTION

The present disclosure generally relates to compositions and methods formed using biomass material. More particularly, examples of the disclosure relate to methods and compositions suitable for use in the formation of electrodes suitable for energy storage devices.

BACKGROUND OF THE DISCLOSURE

Energy storage devices have become a cornerstone in our era of technological proliferation and electrification, the most prevalent of which is the rechargeable or secondary battery. As energy storage plays an increasingly crucial role in society, technologists continue to address the problems with typical batteries. Typical batteries generally include lithium, lead, and/or cobalt in the electrode. In recent years, the extraction practices to obtain these minerals around the world, especially in mining operations, have been linked to environmental degradation, as well as human rights impacts, such as long-term health risks and dangerous conditions for workers, child labor and underpayment, forced evictions, police detentions, and armed conflict. Furthermore, battery manufacturing with such electrode material carries a high environmental load due to the caustic life cycle, as well as potentially long lead-times due to the vast distances in transportation along the supply chain.

Furthermore, when batteries reach end of life, the devices are generally considered hazardous waste due to their toxic compounds. Batteries often reach landfills, where toxins from the batteries can leach into the environment, eventually polluting water, air, and food. These toxic materials are known to cause disease, reproductive harm, and death. For social, environmental, and economic reasons, a reduction in reliance on these minerals by advancing battery chemistry and developing other energy storage devices for specific applications is desired.

Supercapacitors hold promise for replacing or supplementing typical batteries in a wide range of energy storage applications, including internet of things (IoT) devices, portable electronics, uninterruptible power sources, medical devices, load leveling, residential power banks, grid power banks, and electric vehicles.

Figure 1:
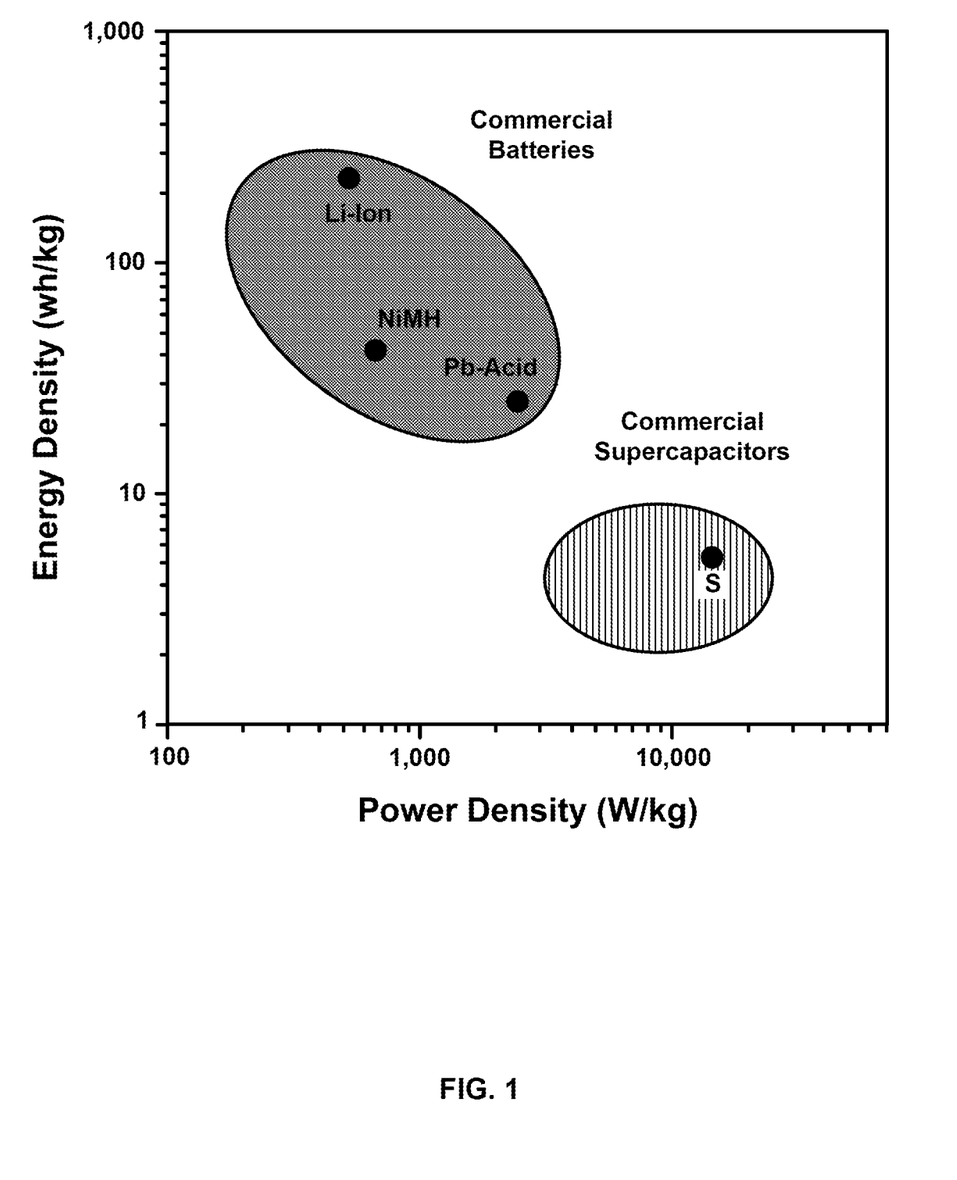
FIG. 1 illustrates performance characteristics of exemplary energy storage devices.

The energy density of supercapacitors generally exceeds that of traditional capacitors by 2 to 3 orders of magnitude; however, current implementations of supercapacitors have an energy density an order of magnitude smaller than that of a battery. FIG. 1 illustrates energy density and power density of typical types of batteries, including supercapacitors.

Standard supercapacitors also have the disadvantage of a high self-discharge rate and linearly declining discharge voltage. Supercapacitors generally have a discharge rate of a matter of seconds, compared with hours for many batteries of similar energy. Additionally, supercapacitors have a life cycle on the order of 1 million, whereas typical batteries have a life cycle of less than 1,000.

Typical supercapacitors can include electrodes made from activated carbons, templated carbons, carbon nanofibers, carbon nanotubes, carbide-derived carbons, or graphene. Unfortunately, such supercapacitor electrode material typically requires the use of an additional binder material for mechanical structure, which increases electrode material resistance, increasing internal losses and therefore lowering power density. Additionally, binder material dilutes an amount of active material per volume of electrode material, and therefore lowers the energy density of batteries including such materials. Also, binder material is often an environmentally detrimental, petroleum-derived compound such as polyvinylidene fluoride (PVDF), polyvinylpyrrolidone (PVP), or polyvinyl alcohol (PVA). Therefore, more performant materials for use in electrodes are desired.

Furthermore, carbon-based material for use in electrodes can be relatively expensive, compared to other materials that can be used to form electrodes. Therefore, improved methods of forming compositions suitable for use in electrodes are also desired.

Any discussion, including discussion of problems and solutions, set forth in this section has been included in this disclosure solely for the purpose of providing a context for the present disclosure. Such discussion should not be taken as an admission that any or all of the information was known at the time the invention was made or otherwise constitutes prior art.

SUMMARY OF THE DISCLOSURE

This summary may introduce a selection of concepts in a simplified form, which may be described in further detail below. This summary is not intended to necessarily identify key features or essential features of the claimed subject matter, nor is it intended to be used to limit the scope of the claimed subject matter.

Various embodiments of the present disclosure relate to methods of forming a composition from biomass material—for example, forming a composition suitable for use as an electrode material, to compositions formed from biomass material—e.g., suitable for forming an electrode, to electrodes formed using the methods or composition, and to devices, such as energy storage devices or batteries (e.g., electrochemical cells, capacitors, and electrostatic devices), including the electrode and/or material. By way of particular examples, the compositions can be used to form anode and/or cathode material for solid-state rechargeable batteries, anode and/or cathode material for non-solid-state rechargeable batteries, and/or electrode material (e.g., anode and/or cathode) for solid-state or non-solid state symmetric or asymmetric supercapacitors, pseudocapacitors, and the like. While the ways in which the present disclosure addresses deficiencies or prior methods and compositions are discussed in more detail below, in general, the present disclosure provides methods that are relatively easy and/or inexpensive to perform and/or compositions that are relatively inexpensive and/or have other desirable (e.g., environmentally friendly) properties.

In accordance with exemplary embodiments of the disclosure, methods of forming a composition (e.g., suitable for use as an electrode material) are disclosed. Exemplary methods of forming a composition include providing biomass material, forming biochar material using a first process, mixing and grinding the biochar material with an activation compound comprising one or more of fungi material and silicaceous material to form a mixture, and exposing the mixture to a second process to form the composition. In some cases, the biochar process and activation process may be combined into a single process. The biomass material can be derived from a variety of sources, such as plant-based (e.g., lignocellulosic) material. The activation compound can include additional compounds, such as, for example, one or more metal salts, acids, and/or bases (e.g., inorganic compounds). In accordance with various aspects of these embodiments, one or more of the first process and the second process comprise pyrolysis.

In accordance with yet additional exemplary embodiments of the disclosure, compositions (e.g., suitable for forming an electrode) are disclosed. Exemplary compositions can be formed using a method described herein. Additionally or alternatively, exemplary compositions can include an activated material mixture formed from biochar material and an activation compound comprising one or more of fungi material and silicaceous material. The biochar material can be or include, for example, plant-based biochar material. The biochar material can be formed (e.g., using pyrolysis) prior to forming the activated material mixture. In accordance with further examples of the disclosure, the activation compound additionally includes an inorganic compound, such as one or more metal salts, acids, and/or bases. In some cases, the composition does not include an additional binder.

In accordance with yet additional embodiments of the disclosure, a device or portion thereof is formed using or including the composition. Exemplary devices and device portions include electrodes, electrostatic devices, electrochemical cells, capacitors, electrical double layer capacitors (e.g. supercapacitors, pseudocapacitors, ultracapacitors, etc.), and the like. In some cases, an electrode in such devices does not include an additional binder.

These and other embodiments will become readily apparent to those skilled in the art from the following detailed description of certain embodiments having reference to the attached figures. The invention is not being limited to any particular embodiments disclosed.

BRIEF DESCRIPTION OF THE DRAWING FIGURES

A more complete understanding of the embodiments of the present disclosure may be derived by referring to the detailed description and claims when considered in connection with the following illustrative figures.

It will be appreciated that elements in the figures are illustrated for simplicity and clarity and have not necessarily been drawn to scale. For example, the dimensions of some of the elements in the figures may be exaggerated relative to other elements to help improve understanding of illustrated embodiments of the present disclosure.

DETAILED DESCRIPTION OF EXEMPLARY EMBODIMENTS

The description of exemplary embodiments of methods, compositions, devices and portions thereof provided below is merely exemplary and is intended for purposes of illustration only; the following description is not intended to limit the scope of the disclosure or the claims. Moreover, recitation of multiple embodiments having stated features is not intended to exclude other embodiments having additional features or other embodiments incorporating different combinations of the stated features. For example, various embodiments are set forth as exemplary embodiments and may be recited in the dependent claims. Unless otherwise noted, the exemplary embodiments or components thereof may be combined or may be applied separate from each other.

As set forth in more detail below, various embodiments of the disclosure provide methods for forming compositions suitable for a variety of applications, including use in electrodes of, for example, energy storage devices. Exemplary methods can be relatively inexpensive, relatively environmentally friendly, and/or relatively easy to perform, compared to traditional methods. As a result, the compositions and devices formed with or using the methods can also be relatively inexpensive, environmentally friendly, or the like.

In this disclosure, "electrode" can include material that is conductive. An electrode can include a composition as set forth herein and, in some cases, may include additional material. An electrode can form part of various types of devices, such as electrochemical cells, capacitors, supercapacitors, ultracapacitors, pseudocapacitors, electrostatic devices, other energy storage devices, and the like.

As used herein, the term "biomass material" can refer to material that is derived from an animal or plant. In some cases, the biomass material is plant derived. In these cases, the biomass material includes lignocellulosic material. The lignocellulosic material can be derived from, for example, hardwoods (e.g., yellow poplar, white oak), coconut shells, fruit stones (e.g., almond shells, cherry pit shells), synthetic crystals (e.g., microcrystalline cellulose, which is derived from wood pulp), hemp, fungi, or the like. Biomass material can include, for example, bast fibers and/or hurd material. In some cases, the biomass may be innoculated with fungi.

As used herein, the term "pyrolyze," "pyrolysis" or similar a term can refer to any reaction that includes use of applied heat.

Further, in this disclosure, any two numbers of a variable can constitute a workable range of the variable, and any ranges indicated may include or exclude the endpoints. Additionally, any values of variables indicated (regardless of whether they are indicated with "about" or not) may refer to precise values or approximate values and include equivalents, and may refer to average, median, representative, majority, or the like. Further, in this disclosure, the terms "including," "constituted by" and "having" can refer independently to "typically or broadly comprising," "comprising," "consisting essentially of," or "consisting of" in some embodiments. In this disclosure, any defined meanings do not necessarily exclude ordinary and customary meanings in some embodiments.

Figure 2:
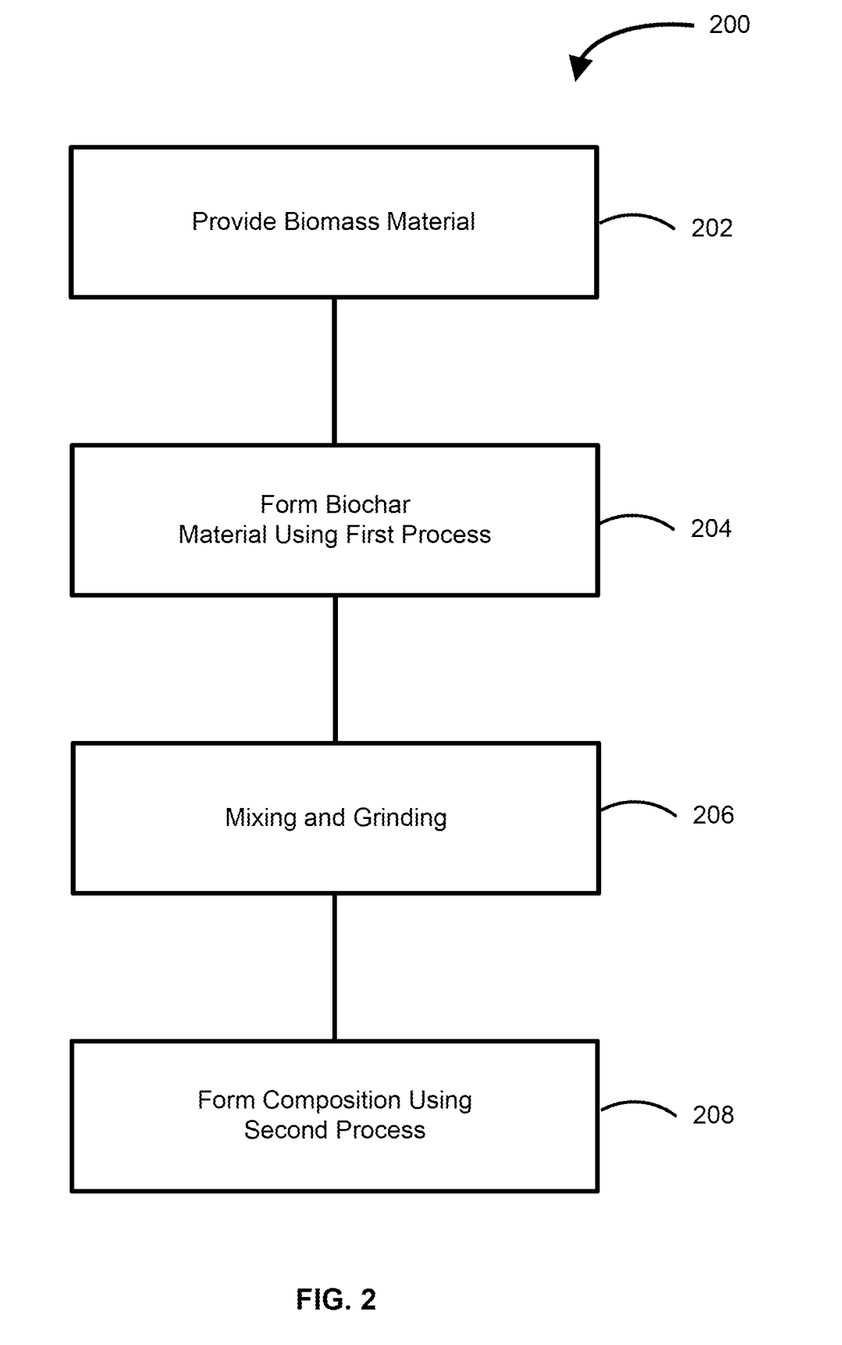
FIG. 2 illustrates a method in accordance with exemplary embodiments of the disclosure.

Turning again to the figures, FIG. 2 illustrates a method 200 in accordance with exemplary embodiments of the disclosure. Method 200 can be used to, for example, form a composition—e.g., suitable for use as or in the formation of an electrode—e.g., of an energy storage device.

Method 200 includes the steps of providing biomass material (step 202), forming biochar material using a first process (step 204), mixing and grinding the biochar material with an activation compound comprising one or more of fungi material and silicaceous material to form a mixture (step 206), and exposing the mixture to a second process to form the composition (step 208).

During step 202, biomass material is provided. As noted above, the biomass material can be or include a variety of materials, including, for example, lignocellulosic material. The lignocellulosic material can be derived from, for example, one or more of hardwoods, coconut shells, fruit stones, synthetic crystals (e.g., microcrystalline cellulose, which is derived from wood pulp), hemp, fungi, and the like. By way of particular examples, the biomass material can be or include hemp material, such as hemp bast material and/or hemp hurd material.

During step 204, biochar material is formed from the biomass material using a first process. The first process can include, for example, pyrolysis. The pyrolysis can be performed using a hydrothermal reactor. In some embodiments of the disclosure, step 204 includes heating the biomass material to a temperature of less than 1200° C. and/or more than 50° C. For example, in some embodiments of the disclosure, step 204 includes heating the biomass material to a temperature between about 150° C. and about 200° C., about 500° C. and about 800° C., or about 1000° C. and about 1200° C. A pressure within a reactor during step 204 may also be regulated. For example, in some embodiments of the disclosure, the pressure within the reactor may be less than 50,000 Torr or between 760 Torr and 1000 Torr, about 10,000 Torr and 15,000 Torr, or about 45,000 Torr and 50,000 Torr. A duration of step 204 can be about 0.1 to about 1 hours, about 10 to about 24 hours, or about 24 to about 96 hours.

During step 206, biochar material from step 204 is mixed and ground with an activation compound comprising one or more of fungi material and silicaceous material to form a mixture. The mixing and grinding can be performed using, for example, an agate mortar and pestle.

The mixture (or composition) can include about 0 or greater than 0 to about 14%, greater than 0 to about 12%, or about 4 to about 10% fungi material. All percentages set forth herein are weight percentages—unless noted otherwise. Additionally or alternatively, the activation compound can include about 0 or greater than 0 to about 14%, greater than 0 to about 14%, or about 4 to about 10% percent silicaceous material. Additionally or alternatively, the mixture (or composition) can include about 40-80%, about 45-75%, or about 40-60% biomass material and/or about 5-60%, about 10-70%, or about 40-60% activation compound.

Fungi material suitable for use with examples of the disclosure include one or more of cordyceps, shiitake, lion's mane, cremini, portobello, turkey tail, and reishi, or other fungi in any combination. In some cases, the activation compound can include fungal fruiting body, mycelium, lichen, or mineral in addition to, or in place of, the fungi.

The silicaceous material can include, for example, polysilicate material. In some cases, the silicaceous material can include mica.

The activation compound can additionally include, for example, one or more of a metal salt and an acid, and/or a base (e.g., inorganic compounds). By way of particular examples, the activation compound can additionally include one or more of zinc chloride ($ZnCl_2$), phosphoric acid ($H_3PO_4$), aluminum chloride ($AlCl_3$), magnesium chloride ($MgCl_2$), sodium hydroxide (NaOH), and potassium hydroxide (KOH).

During step 208, the mixture from step 206 is exposed to a second process to form the composition. The second process can be, for example, a pyrolysis process. As above, the pyrolysis can be performed using a hydrothermal reactor. A temperature during step 208 can be less than 1200° C. and/or more than 50° C. For example, in some embodiments of the disclosure, step 208 includes heating the mixture to a temperature between about 150° C. and about 200° C., about 500° C. and about 800° C., or about 1000° C. and about 1200° C. A pressure within a reactor during step 208 may also be regulated. For example, in some embodiments of the disclosure, the pressure within the reactor may be less than 50,000 Torr or between 760 Torr and 1000 Torr, about 10,000 Torr and 15,000 Torr, or about 45,000 Torr and 50,000 Torr. A duration of step 208 can be about 0.1 to about 1 hours, about 10 to about 24 hours, or about 24 to about 96 hours.

In accordance with examples of the disclosure, a composition formed using method 200 does not undergo chemical washing and/or mixing with binder material or binder solvent.

The composition formed using method 200 can include an activated material mixture formed from biochar material and an activation compound comprising one or more of fungi material and silicaceous material. The biochar material, activation compound, fungi material, and/or silicaceous material can be as described above.

In accordance with various examples of the disclosure, the composition includes highly conductive (e.g., conductivity of about 10-1000 S/m) and high surface area carbon (e.g., surface area of about 100-10,000 m2/g). Two generally desirable characteristics of electrode material for use in energy storage devices include high surface area and high cation exchange capacity (cation exchange capacity is generally related to electrical conductivity). Exemplary compositions described herein exhibit one or both of these desired characteristics.

In accordance with further examples, the composition includes minerals (e.g., from the activation compound) that are beneficial to soil health. Therefore, as illustrated in more detail below in connection with FIG. 6, in at least some cases, the electrode material can be composted after use in an energy storage device, and provide beneficial nutrients to soil. In such cases, the composition may not include any additional or any petroleum-based binders.

Figure 3:
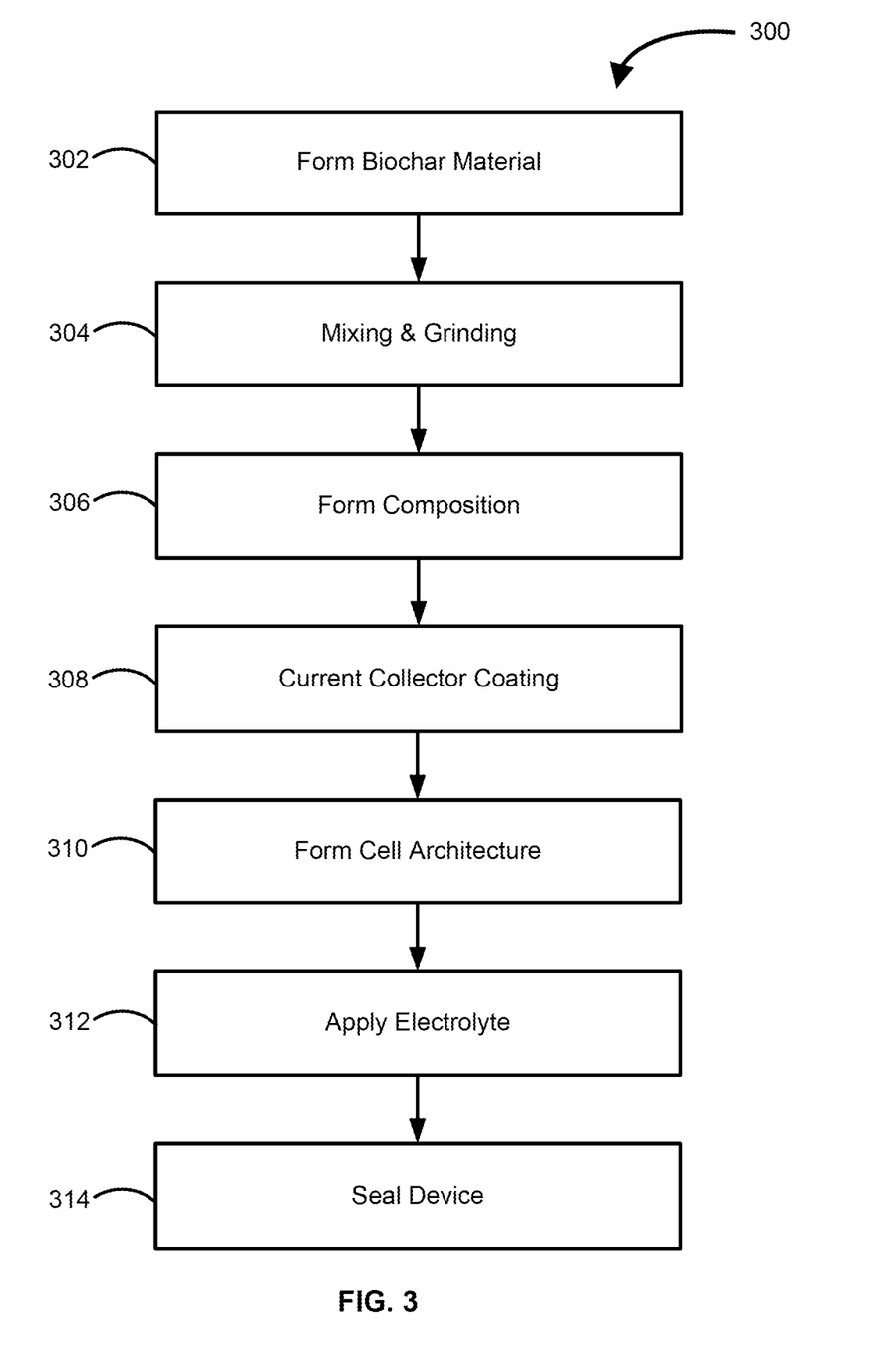
FIG. 3 illustrates another method in accordance with exemplary embodiments of the disclosure.

FIG. 3 illustrates another method 300 in accordance with examples of the disclosure. FIG. 3 includes additional steps used to form a device. Method 300 includes the steps of forming biochar material (step 302), mixing and grinding (step 304), forming a composition (step 306), coating a current collector (step 308), forming cell architecture (step 310), applying an electrolyte (step 312), and sealing a device (step 314).

Steps 302-306 can be the same or similar to steps 204-208 described above in connection with FIG. 2. During step 308, the composition formed using steps 302-306 is applied to a surface of a current collector. The current collector can be or include any suitable conducting material, such as, for example, graphite foil, copper, stainless steel, aluminum, titanium, or the like. Any suitable technique can be used to apply the composition to the current collector. By way of example, the composition can be applied to the current collector using roll-to-roll techniques, chemical vapor deposition techniques, or otherwise. In accordance with examples of the disclosure, the composition can be coated onto a surface of the current collector without the use of an additional (e.g., a petroleum-based) binder.

During step 310, a device cell architecture is formed. For example, in the case of electrochemical cells, an anode, a cathode, and a separator and/or electrolyte can be assembled. The anode and/or cathode can include the composition. In some cases, the separator can include the composition. The electrochemical cells can be cyclical, wound or stacked to form a battery.

In the case of liquid electrolyte batteries, during step 312, an electrolyte can be added (e.g., by injection, sputtering, or other means) to the structures formed during step 310. Alternatively, a solid electrolyte can be included in the architecture formed during step 310. Exemplary liquid electrolytes include sulfuric acid and optionally one or more KOH, KCl, $Na_2SO_4$, $K_2SO_4$ or non-aqueous electrolytes including, for example, lithium hexafluorophosphate. Exemplary solid electrolytes include sodium electrolytes, polytetrafluoroethylene, polyvinyl acetate, polyvinylidene fluoride, and cellulose acetate.

During step 314, a device can be sealed—e.g., using a pouch, a button cell, a cylinder, or the like. In some cases, a vacuum can be applied to the cell(s) prior to sealing the device.

Figure 4:
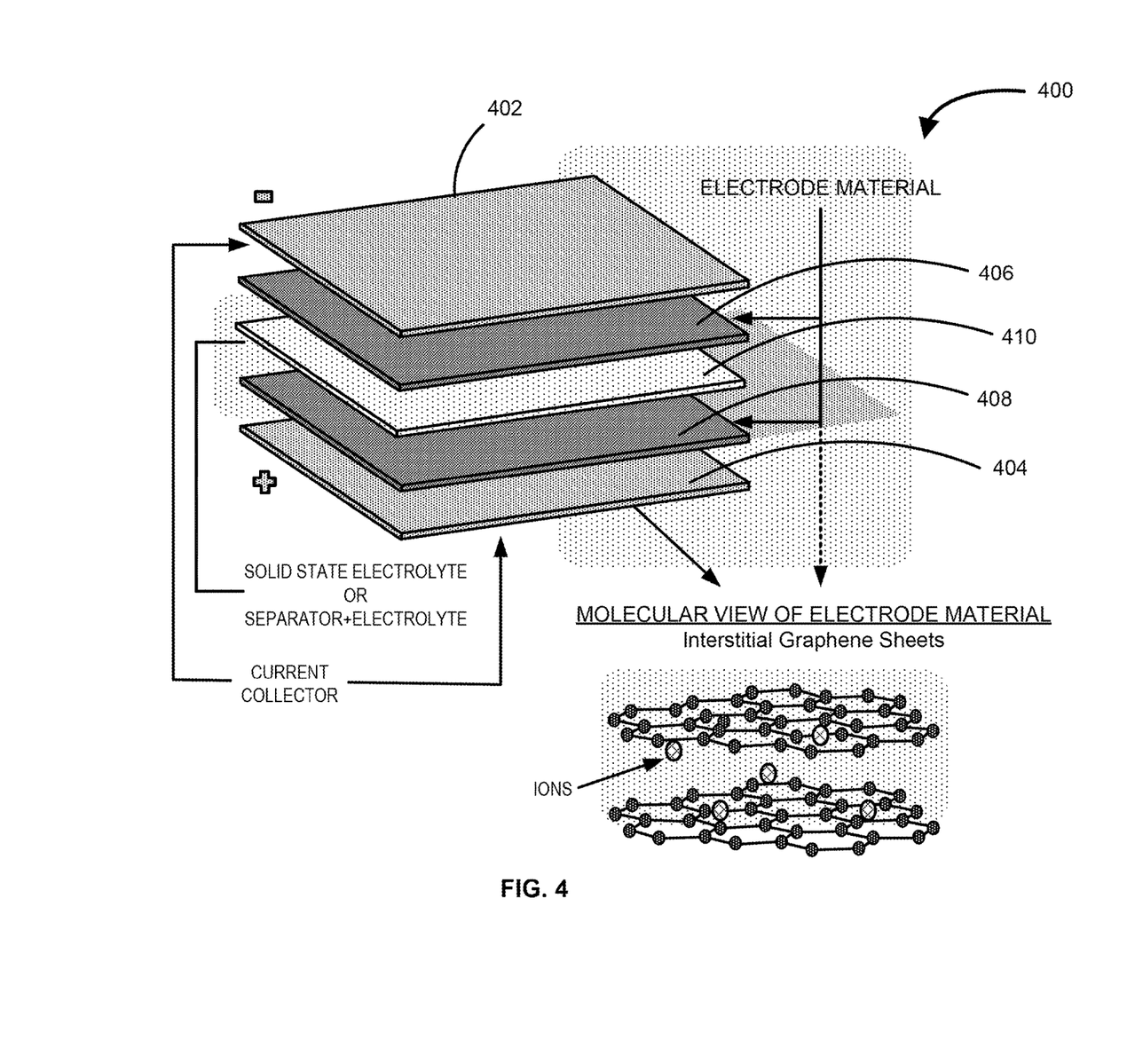
FIG. 4 illustrates a device in accordance with exemplary embodiments of the disclosure.

FIG. 4 illustrates a device 400 in accordance with exemplary embodiments of the disclosure. Device 400 can be an energy storage device, such as an electrochemical cell that forms part of a battery, a supercapacitor, an ultracapacitor, a capacitor, an electrical double layer capacitor (e.g., supercapacitor, pseudocapacitor, etc.), or the like. Device 400 includes current collectors 402, 404; electrodes 406, 408; and separator 410.

Current collectors 402, 404 can be formed of any suitable conductive material. By way of examples, current collectors can be formed of sheets—for example, conducting material, such as, for example, graphite foil, copper, stainless steel, aluminum, titanium, or the like.

Electrodes 406, 408 can be or include a composition as described herein. One of electrodes 406, 408 can function as an anode during discharge of device 400 and the other of electrodes 406, 408 can function as a cathode during discharge of device 400. During operation of device 400, cations can be reduced at the cathode and ions or metals can be oxidized at the anode. In secondary electrochemical cells, anodes and cathodes can be reversed upon application of sufficient voltage to charge the cell.

As illustrated in FIG. 4, electrodes 406, 408 can include graphene or graphene-like material. That is, a composition as described herein can include graphene or graphene-like material. Graphene or graphene-like material is thought to be advantageous, relative to non-graphene, activated carbon, because graphene has a higher surface area per weight or volume. Thus, cells formed with graphene material can exhibit higher energy and power densities.

Separator 410 can include any suitable non-conducting material. In accordance with some examples of the disclosure, separator 410 includes a composition as described herein. In accordance with further examples, separator 410 can be or include hemp-based material (e.g., hemp paper), polypropylene, woven polyester, polypropylene (PP), polyethylene (PE), Teflon, PVdF, PVC, fiberglass, cellulose (from various sources), cellophane, or the like.

Device 400 can also include an electrolyte. In some cases, the electrolyte and the separator can be the same or form part of the same layer (e.g., layer/separator 410). In other cases, device 400 can include a liquid electrolyte. Exemplary solid electrolytes suitable for use with device 400 include the exemplary solid electrolytes noted above. Exemplary liquid electrolytes suitable for use with device 400 include those noted above.

Figure 5:
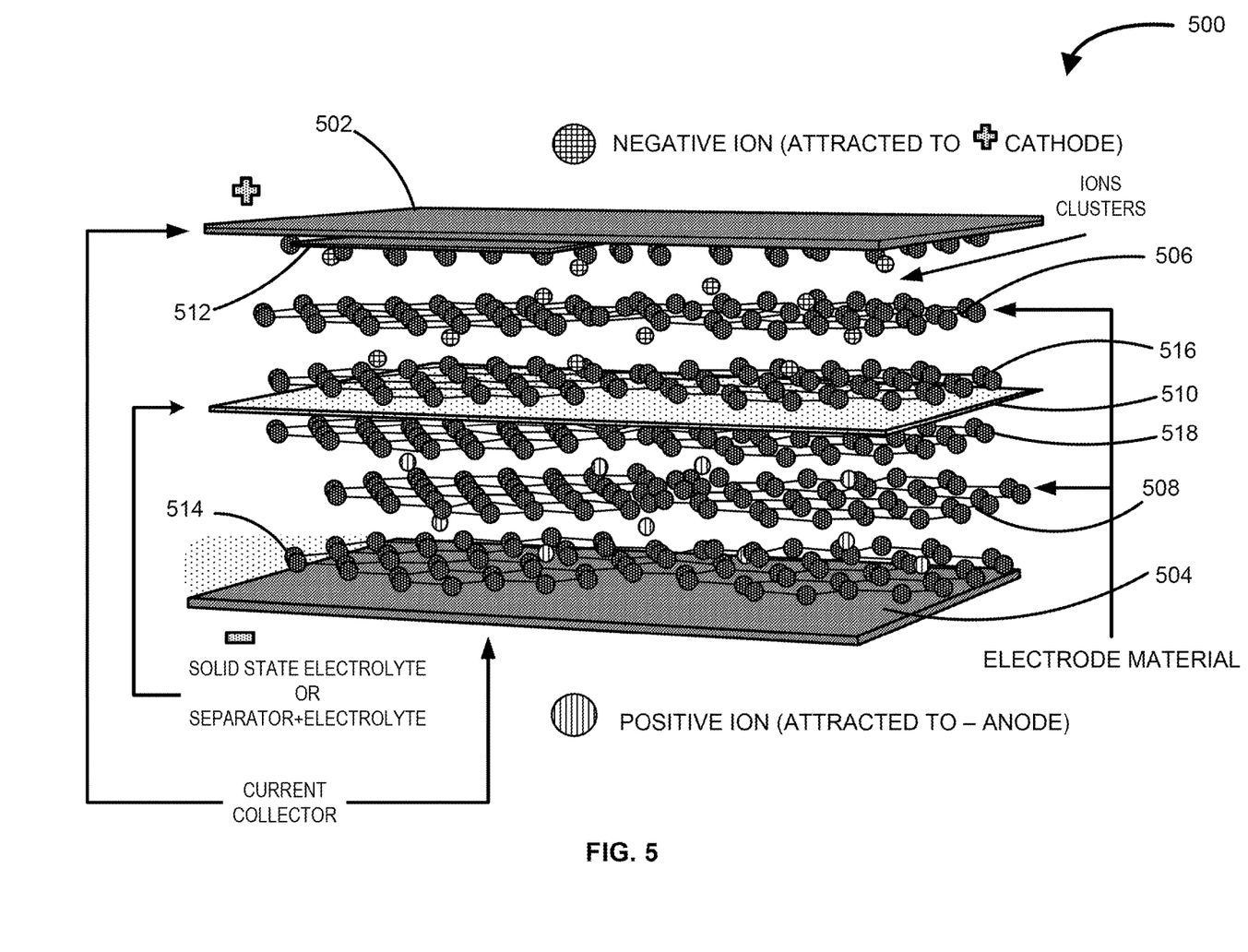
FIG. 5 illustrates a device in accordance with additional exemplary embodiments of the disclosure.

FIG. 5 illustrates operation of a device 500, which can be the same or similar to device 400. Device 500 includes current collectors 502, 504; electrodes 506, 508; and separator 510.

In the illustrated example, current collector 502 and electrode 506 are positively charged and current collector 504 and electrode 508 are negatively charged. When current collectors 502, 504 are applied to an external circuit and electrons are allowed to flow, negative ions are attracted to positively charged current collector 502 and electrode 506 and/or positive ions are attracted to negatively charged current collector 504 and electrode 508. The electrodes including a composition as described herein can provide hierarchical porous carbon structures with high surface area interstitial lattice sites allowing ionic intercalation on the electrodes.

Figure 6:
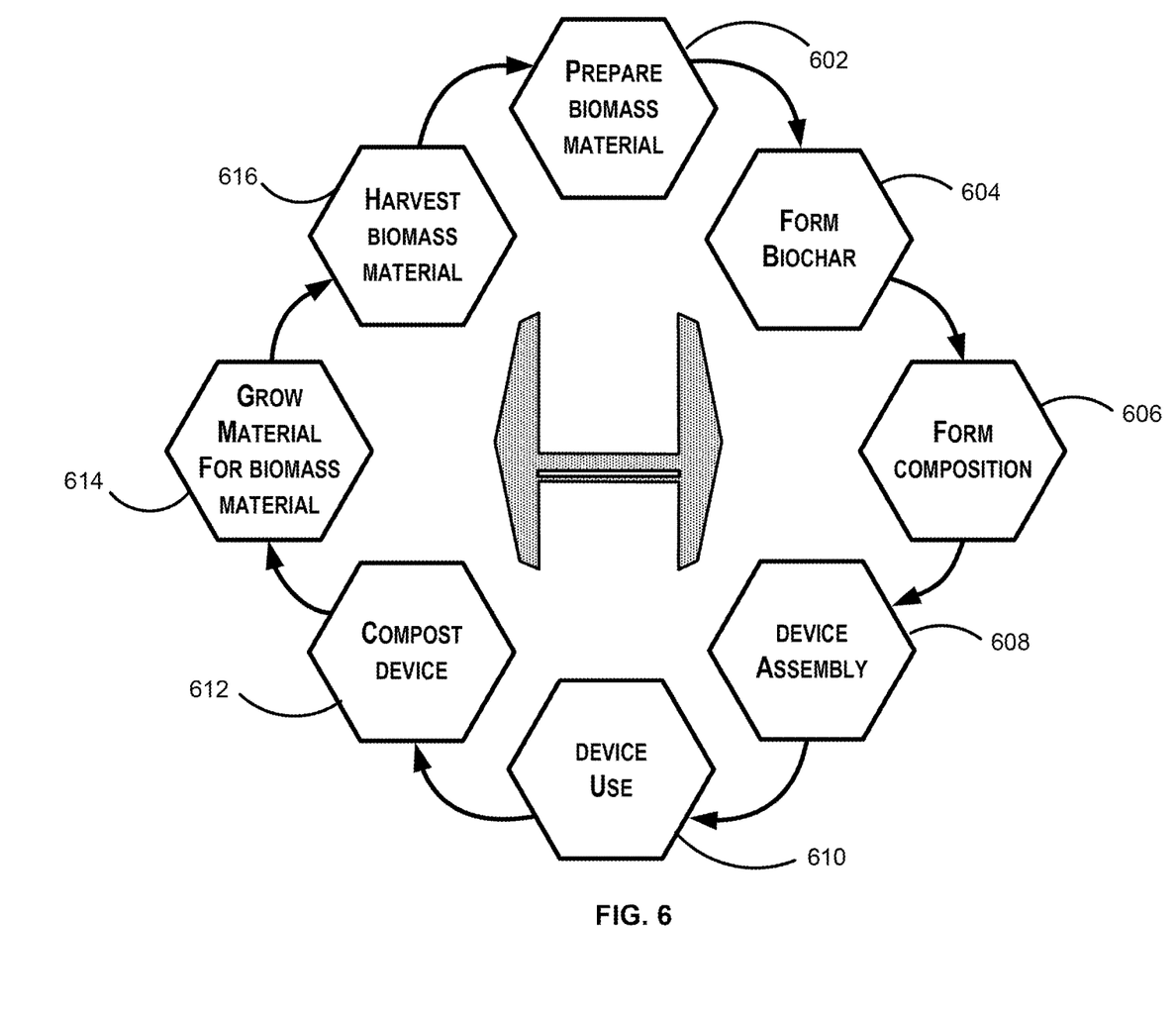
FIG. 6 illustrates an energy storage device life cycle in accordance with additional exemplary embodiments of the disclosure.

FIG. 6 illustrates exemplary steps 602-616 for energy storage devices in accordance with examples of the disclosure. As illustrated, biomass material can be prepared during step 602. For example, the biomass material can be decorticated. Biochar material can then be formed, and a composition can be formed during steps 604 and 606—e.g., as described above in connection with FIGS. 2 and 3. A device can be assembled during step 608—e.g., as described in connection with FIG. 3. The device can then be used during step 610—e.g., until the device no longer provides the desired performance. During step 612, portions of the device—e.g., one or more electrodes and/or a separator—can be composted. During step 614, biomass can be grown—e.g., using the composted material from step 612. Finally, during step 616, the biomass can be harvested and used in step 602 to repeat a cycle.

Energy storage devices in accordance with the present disclosure when applied in supercapacitor chemistry exhibit energy densities in the range of about 0-400 Wh/kg or 100-400 Wh/kg and/or power densities in the range of about 500 W/kg-5 kW/kg.

The example embodiments of the disclosure described above do not limit the scope of the invention, since these embodiments are merely examples of the embodiments of the invention, which is defined by the appended claims and their legal equivalents. Any equivalent embodiments are intended to be within the scope of this invention. Indeed, various modifications of the disclosure, in addition to those shown and described herein, such as alternative useful combinations of the elements described, may become apparent to those skilled in the art from the description. Such modifications and embodiments are also intended to fall within the scope of the appended claims.

The invention claimed is:

1. A method of forming a composition suitable for use as an electrode material, the method comprising the steps of:
   providing a biomass material, wherein the biomass material comprises a hemp material;
   forming a biochar material from the biomass material using a first pyrolysis process, wherein the first pyrolysis process comprises heating the biomass material to a temperature between 500° C. and 800° C.;
   mixing the biochar material with an activation compound to form a mixture, wherein the activation compound comprises an inorganic compound, and wherein the mixture comprises the activation compound in an amount between 40 weight percent (wt. %) and 70 wt. % based on a total weight of the mixture; and forming the composition from the mixture using a second pyrolysis process, wherein the second pyrolysis process comprises heating the mixture to a temperature between 500° C. and 1,000° C.

2. The method of claim 1, wherein the hemp material comprises hemp bast material.

3. The method of claim 1, wherein the hemp material comprises hemp hurd material.

4. The method of claim 1, wherein the first pyrolysis process is performed using a hydrothermal reactor.

5. The method of claim 1, wherein a duration of the first pyrolysis process is between 1 hour and 10 hours.

6. The method of claim 1, wherein mixing the biochar material with the activation compound to form the mixture comprises mixing and grinding the biochar material with the activation compound to form the mixture.

7. The method of claim 1, wherein the activation compound comprises zinc chloride ($ZnCl_2$).

8. The method of claim 1, wherein the activation compound comprises phosphoric acid ($H_3PO_4$).

9. The method of claim 1, wherein the activation compound comprises aluminum chloride ($AlCl_3$).

10. The method of claim 1, wherein the activation compound comprises magnesium chloride ($MgCl_2$).

11. The method of claim 1, wherein the activation compound comprises potassium hydroxide (KOH).

12. The method of claim 1, wherein the activation compound comprises sodium hydroxide (NaOH).

13. The method of claim 1, wherein a duration of the second pyrolysis process is between 1 hour and 10 hours.

14. The method of claim 1, wherein the composition comprises carbon having a conductivity of between 10 S/m and 1,000 S/m.

15. The method of claim 1, wherein the composition comprises carbon having a surface area of between 100 $m^2$/g and 10,000 $m^2$/g.

16. The method of claim 1, further comprising applying the composition to a surface of a current collector to form a first electrode.

17. The method of claim 16, wherein applying the composition to the surface of the current collector comprises roll-to-roll processing.

18. The method of claim 16, further comprising forming a cell architecture comprising the first electrode, a second electrode, a separator, and an electrolyte.

19. The method of claim 18, wherein the electrolyte comprises sulfuric acid, KOH, KCl, $Na_2SO_4$, and/or combinations thereof.

20. The method of claim 18, wherein the cell architecture is that of a symmetrical electrical double layer capacitor or an asymmetrical electrical double layer capacitor.

21. The method of claim 18, wherein the cell architecture forms a supercapacitor or an ultracapacitor.

22. The method of claim 18, wherein the cell architecture is that of a pseudocapacitor.

* * * * *